(12) United States Patent
Oshima et al.

(10) Patent No.: US 6,588,063 B2
(45) Date of Patent: Jul. 8, 2003

(54) HINGE ASSEMBLY (75) Inventors: Kazuyoshi Oshima, Chiba (JP); Katsuya Imai, Chiba (JP)

(73) Assignee: Sugatsune Kogyo Co., Ltd. (JP)

( * ) Notice: Subject to any disclaimer, the term of this patent is extended or adjusted under 35 U.S.C. 154(b) by 0 days.

(21) Appl. No.: 09/979,896

(22) PCT Filed: May 16, 2001

(86) PCT No.: PCT/JP01/02142
§ 371 (c)(1),
(2), (4) Date: Nov. 28, 2001

(87) PCT Pub. No.: WO01/75258
PCT Pub. Date: Oct. 11, 2001

(65) Prior Publication Data
US 2002/0157213 A1 Oct. 31, 2002

(30) Foreign Application Priority Data
Apr. 4, 2000 (JP) ........................... 2000-101880

(51) Int. Cl.⁷ ........................... E05C 17/64; E05D 11/08
(52) U.S. Cl. ..................................... 16/342; 379/433.13
(58) Field of Search ........................ 16/342, 341, 337, 16/335, 336; 379/433.13

(56) References Cited

U.S. PATENT DOCUMENTS 5,715,575 A * 2/1998 Kubota ........................ 16/342
6,035,491 A * 3/2000 Hartigan et al. ............... 16/342
6,154,927 A * 12/2000 Oi et al. ........................ 16/386
6,295,358 B1 * 9/2001 Kubota ................... 379/433.13
6,308,377 B1 * 10/2001 Maatta ........................ 16/341

FOREIGN PATENT DOCUMENTS

| JP | 08121462 A | * | 5/1996 | ........... F16C/11/10 |
| JP | 08317027 A | * | 11/1996 | ........... H04M/1/02 |

* cited by examiner

Primary Examiner—Anthony Knight
Assistant Examiner—Doug Hutton
(74) Attorney, Agent, or Firm—Eugene Stephens & Associates (57) ABSTRACT A cam portion 5 is composed of a first to fifth arcuate surfaces 51 to 55. The first arcuate surface 51 is arranged such that when a cover member C of a cellular telephone is located in a neutral position, a plate spring portion 22 contacts a crossing portion 56 where the first arcuate surface 51 crosses an orthogonal line Lp passing through a center of curvature of the first arcuate surface 51 and orthogonal to a rotation axis L. A second and a third arcuate surface 52, 53 are arranged on both sides of the first arcuate surface 51. Radii of curvature of the second and third arcuate surfaces are set to be larger than a radius of curvature of the fist arcuate surface 51.

5 Claims, 10 Drawing Sheets

HINGE ASSEMBLY

TECHNICAL FIELD

This invention relates to a hinge assembly used for turnably connecting, for example, a main body and a cover member of a cellular telephone.

BACKGROUND ART

Figure 10:
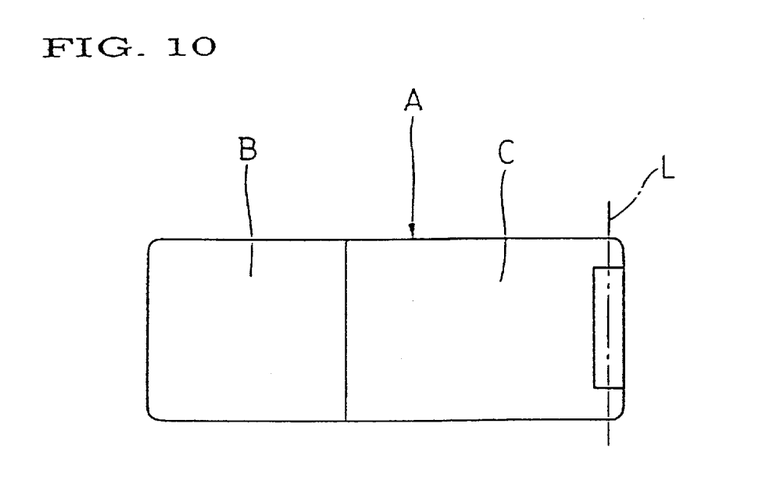
FIG. 10 is a plan view of the above cellular telephone.
Figure 11:
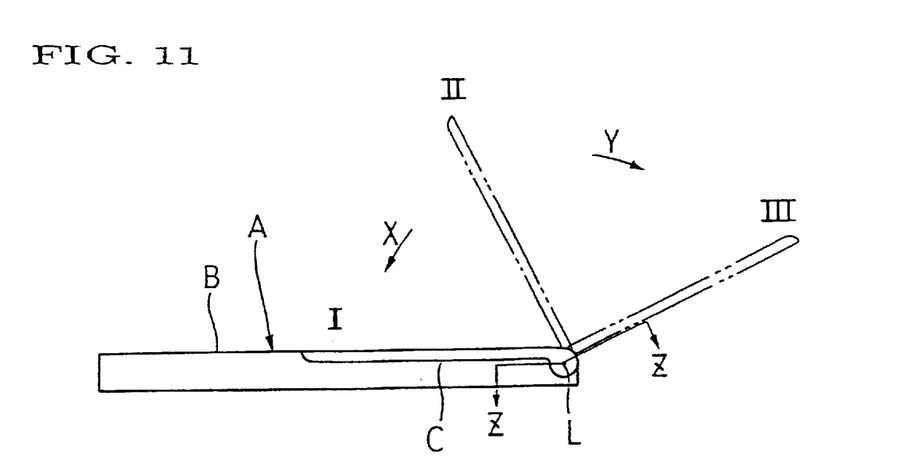
FIG. 11 is a side view of the above cellular telephone.

FIGS. 10 and 11 show one example of a cellular telephone in which a hinge assembly of this type is used This cellular telephone A comprises a main body B and a cover member C turnably connected to the main body B through a hinge assembly (not shown). The cover member C can be turned at least between a closed position I where it contacts the main body B to close the front surface of the main body B and an open position III via a neutral position II.

The conventional hinge assembly used in the above cellular telephone A comprises a hinge main body and a hinge pin turnably connected to the hinge main body. One of the hinge main body and the hinge pin is connected to the main body B of the cellular telephone and the other is connected to the cover member C. By this, the cover member C is turnably connected to the main body B about a rotation axis L (this rotation axis L is in alignment with an axis of the hinge pin).

The hinge main body is provided with a plate spring (resilient member), and a cam portion subject to press contact by the plate spring, is formed on an outer peripheral surface of the hinge pin. The cam portion includes a neutral portion, and a first and a second cam surface mutually reversely extending in a circumferential direction of the hinge pine from this neutral portion. The neutral portion is arranged such that when the cover member C is turned to the neutral position II, the neutral portion contacts the plate spring. The first cam portion is arranged such that when the cover member C is located between the closed position I and the neutral position II, the first cam portion contacts the plate spring, while the second cam portion is arranged such that when the cover member C is located between the neutral position II and the open position III, the second cam portion contacts the plate spring.

The plate spring does not rotationally bias the hinge pin when it is in contact with the neutral portion but it rotation biases the hinge pin in a direction as indicated by an arrow X of FIG. 11 when it is in contact with the first cam surface. When the plate spring is in contact with the second cam surface, it rotation biases the hinge pin in a direction as indicated by an arrow Y of FIG. 11. Hence, although the cover member C maintains a stop state in the neutral position, but it is turned to the closed position or the open position by the plate spring when it is moved away from the neutral position.

The above-mentioned conventional hinge assembly has difficulty in solving the following two problems simultaneously.

The cellular telephone A is desirably designed such that when the cover member C is moved away from the neutral position II, it is immediately turned to the closed position I or the open position III. This can be achieved by reducing the radii of curvature of the first and second cam surfaces, of the hinge assembly. However, if the radii of curvature of the first and second cam surfaces is reduced, a resilient deformation amount of the plate spring is increased against a predetermined rotation angle of the cover member C. For this reason, the plate spring is deteriorated with the passage of time and loses resiliency. As a result, play or rattling occurs between the cover member C and the main body B when the cover member C is in the closed position or in the open position. Or the plate spring is broken.

In contrast, if the radii of curvature of the first and second cam surfaces are increased, the resilient deformation amount of the plate spring due to rotation of the cover member C can be reduced and therefore, the plate spring can be prevented from being deteriorated with the passage of time. However, in that case, the turning force of the plate spring exerted to the cover member C is reduced when the cover member C is located in the nearby portion of the neutral position. It gives arise to another problem that the cover member C cannot be turned to the closed position I or the open position III by the plate spring and the cover member C is turned by hand until the cover member C is greatly moved away from the neutral position.

DISCLOSURE OF INVENTION

In order to solve the above problems, the features of the present invention reside in a hinge assembly comprising a hinge main body and a hinge pin turnably supported by the hinge main body, the hinge main body being provided with a resilient member, the hinge pin being provided on an outer periphery thereof with a cam portion which is to be press contacted by the resilient member, the cam portion including a neutral portion for directing the pressing force of the resilient member to a center of rotation of the hinge pin, and a first and a second cam surface mutually reversely extending in a circumferential direction of the hinge pin from the neutral position and for converting the pressing force of the resilient member into a rotation torque for mutually reversely turning the hinge pin, wherein radii of curvature of nearby portions of the neutral portion (hereinafter simply referred to as the "nearby portions) of the first and second cam surfaces are set to be smaller than radii of curvature of portions (hereinafter referred to as the "separated portions") which follow the nearby portions of the first and second cam surfaces.

In this case, it is preferred that the separated portions of the first and second cam surfaces are composed of a mutually identical arcuate surface, the neutral portion and the nearby portions are composed of an arcuate surface having a smaller radius of curvature than the radii of curvature of the arcuate surfaces forming the separated portions, and a center of curvature of the arcuate surface composing the neutral portion and the nearby portions is arranged on a line passing through the center of curvature of the arcuate surfaces forming the separated portions and orthogonal to the center of rotation of the hinge pin and at a place more separated from the rotation axis than the center of curvature of the arcuate surfaces composing the separated portions.

It is also preferred that the cam portion further includes a turn restricting portion formed on an outer peripheral surface of the hinge pin following at least one of the first and second cam surfaces of the hinge pin and capable of contacting the resilient member at least at two points separated in a circumferential direction of the hinge pin, thereby maintaining the hinge pin in a predetermined rotation position with moderation.

Moreover, it is preferred that two of the cam portions are arranged in point symmetry about the rotation axis of the hinge pin, and two of the resilient members are arranged on cam surfaces of the cam portions in such a manner as to correspond to each other.

BEST MODE FOR CARRYING OUT THE INVENTION

Embodiments of the present invention will be described hereinafter with reference to FIGS. 1 to 16.

Figure 2:
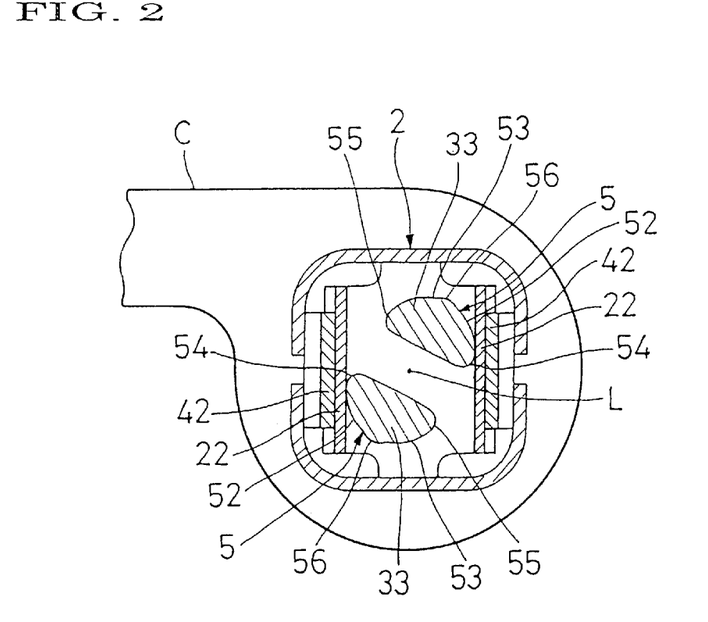
FIG. 2 is a sectional view similar to FIG. 1, in which the cover member is turned to a closed position.
Figure 3:
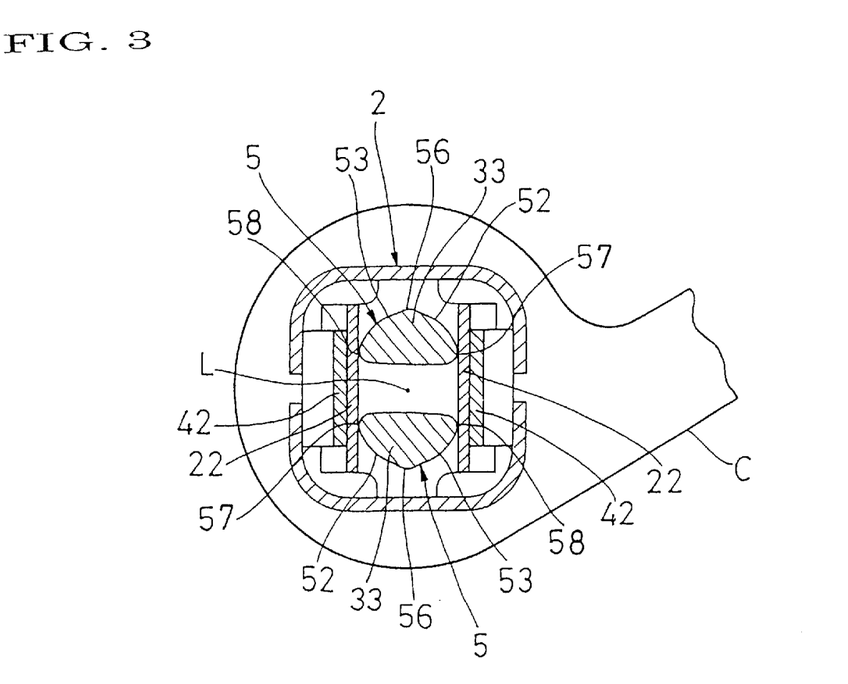
FIG. 3 is a sectional view similar to FIG. 1, in which the cover member is turned to an open position.
Figure 4:
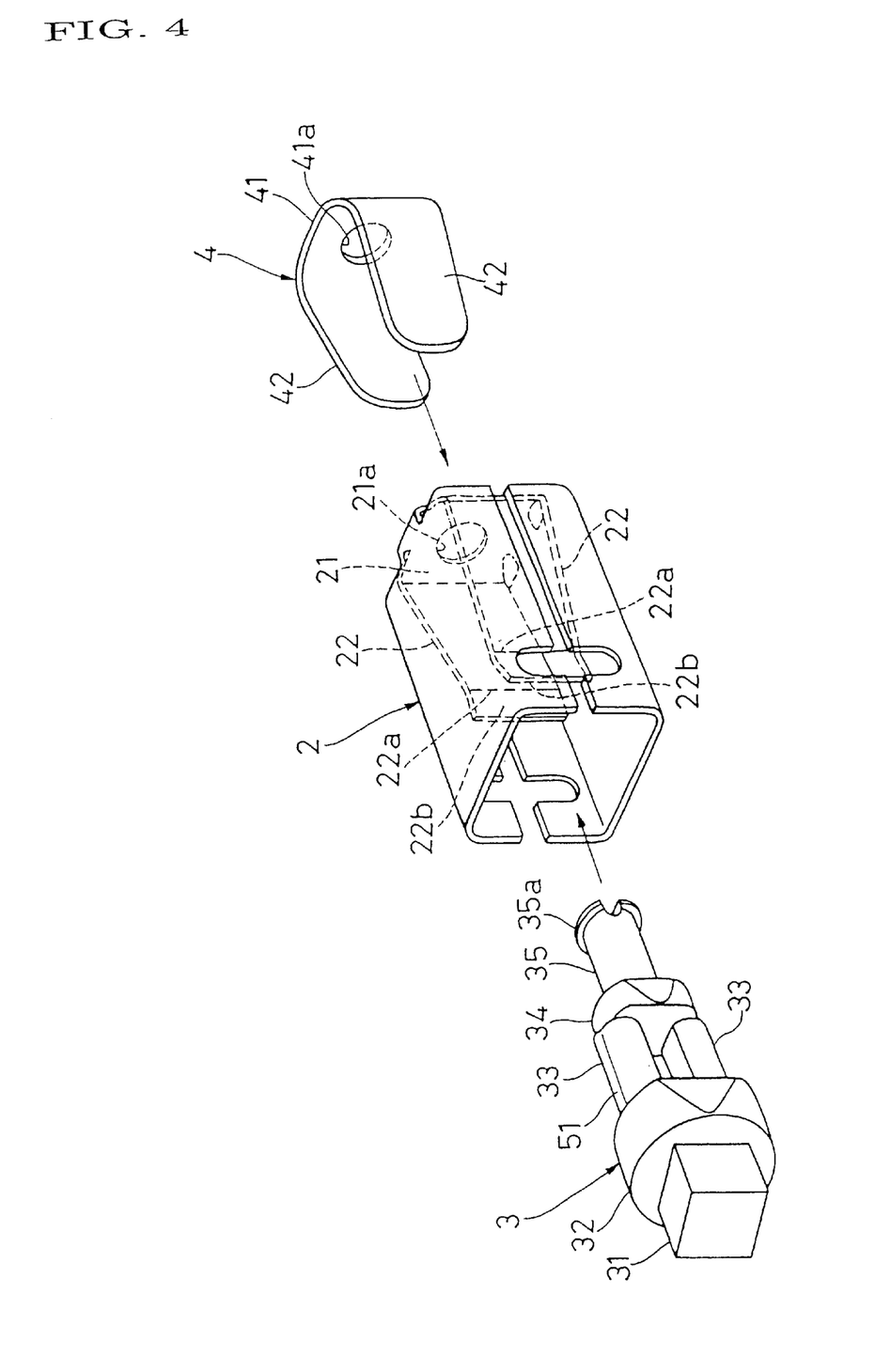
FIG. 4 is an exploded perspective view of the above first embodiment.
Figure 5:
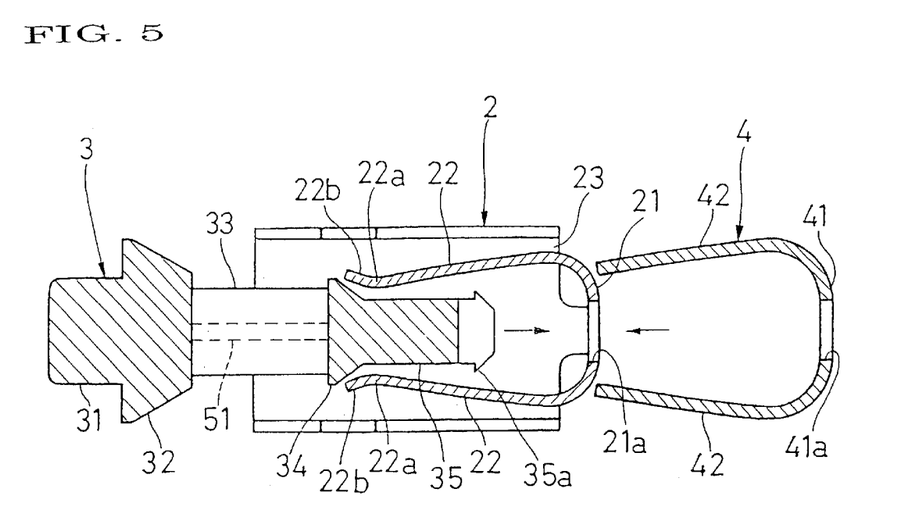
FIG. 5 is a sectional view of the above first embodiment, but showing a state before assembled.
Figure 6:
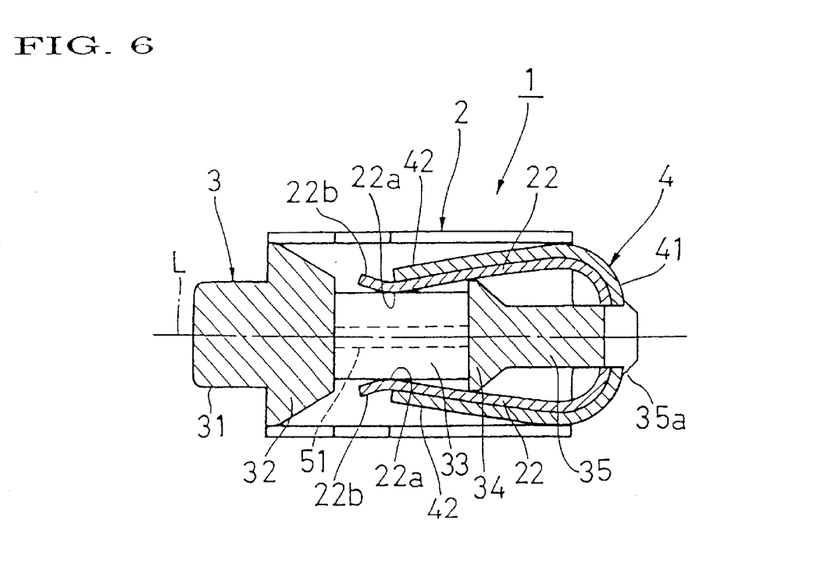
FIG. 6 is a sectional view of the above first embodiment, but showing a state after assembled.

FIGS. 1–9 show one embodiment in which the present invention is applied to a hinge assembly of a cellular telephone A shown in FIGS. 10 and 11. As shown in FIGS. 4 to 6, a hinge assembly 1 of this embodiment comprises a hinge main body 2, a hinge pin 3 and a reinforcement spring 4. The present invention can likewise be applied to a hinge assembly of other types of cellular telephones than the above-mentioned cellular telephone A and of other goods, in which two articles are required to be turnably connected together.

Figure 9:
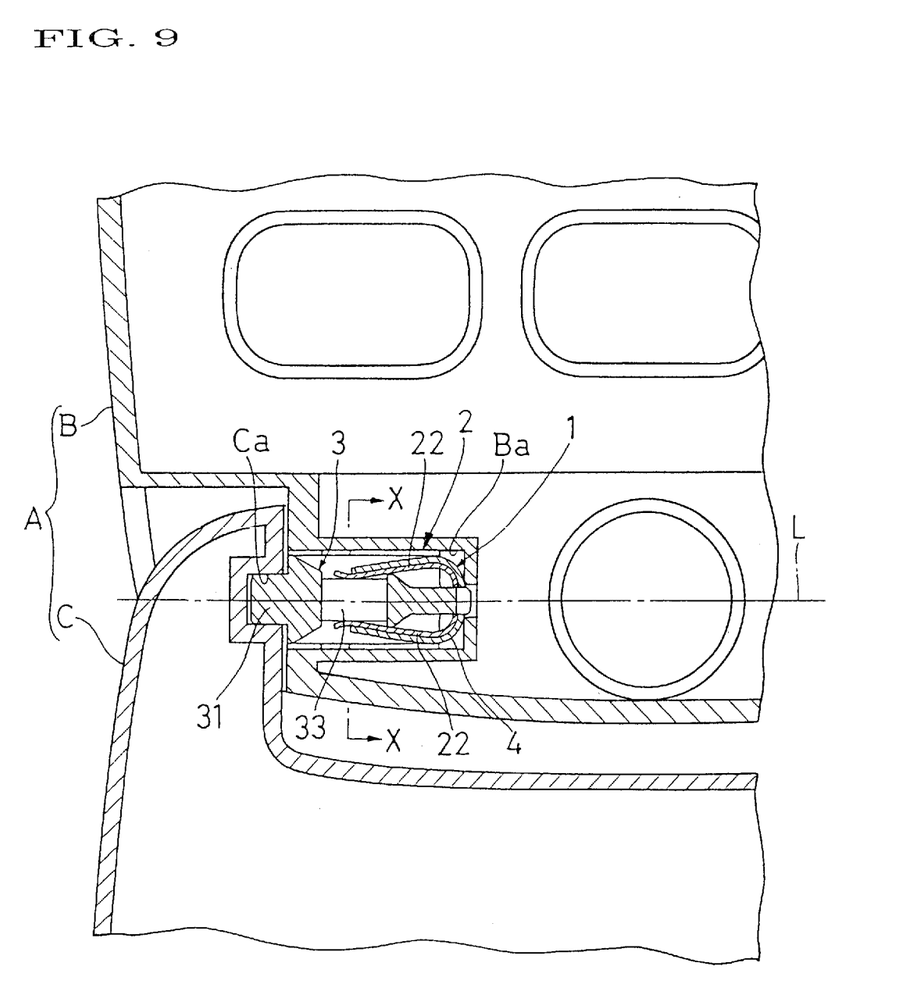
FIG. 9 is an enlarged sectional view taking one line Z—Z of FIG. 11, showing a cellular telephone in which a hinge assembly of the above first embodiment is used.

The hinge main body 2 exhibits a square tubular configuration having a generally regular square shape in section. One end of the hinge main body 2 is open and the other end is closed as a bottom part 21. An engagement hole 21a is formed through a central area of the bottom portion 21 in such a manner as to penetrate therethrough. Plate spring portions 22, 22 (resilient members) are formed on opposing two side portions of the bottom portion 21. The plate spring portions 22, 22 extend within the hinge main body 2 towards one end side thereof. The plate spring portions 22, 22 are slanted in a direction towards each other (namely, towards the opponent plate spring portion) as it goes from the bottom portion 21 side of the hinge main body 2 towards the open portion side. A part of each plate spring portion 22, which is slightly offset to its basal end side from its distal end, is formed as a pinchingly-holding portion 22a which is most proximal to the opponent plate spring portion 22. A part of each plate spring portion 22 between the pinchingly-holding portion 22a and the distal end is formed as a guide portion 22b which is slanted to be away from the opponent plate spring portion 22 towards the open portion side. The hinge main body 2 thus constructed is non-turnably fitted to a hole Ba formed in a main body B of the cellular telephone A with its axis aligned with a rotation axis L, as shown in FIG. 9.

The reinforcement spring 4 has a generally horizontal U-shaped configuration. It includes a basic board portion 41 and a pair of reinforcement plate portions 42, 42 extending from opposite side portions of the basic board portion 41 in a same direction. An engagement hole 41a is formed through a central area of the base portion 41. An inside diameter of the engagement hole 41a is equal to an inside diameter of the above-mentioned engagement hole 21a. The pair of reinforcement plate portions 42, 42 are slanted towards each other as it goes away from the base portion 41. Each reinforcement plate portion 42 is inserted into the hinge main body 2 through a gap 23 (see FIGS. 1 and 5) formed between the plate spring portion 22 of the hinge main body 2 and a peripheral wall portion opposing thereto. Each reinforcement spring portion 42 is inserted into the hinge main body 2 until the basic board portion 41 collides with the bottom portion 21. In that state, an end portion of the reinforcement plate portion 42 on the side of the basic board portion 41 is firmly contacted with an inner surface of the peripheral wall portion of the hinge main body 2 and a distal end portion of the reinforcement plate portion 42 is in collision with a distal end portion of the plate spring portion 22. By this, the reinforcement spring 4 is fixedly connected to the hinge main body 2 and urges the pair of plate spring portions 22, 22 towards each other. In a state in which the reinforcement spring 4 is fixed to the hinge main body 2, an axis of the engagement hole 41a is in alignment with an axis of the engagement hole 21a The hinge pin 3 includes an engagement shaft portion 31, a journal portion 32, a pair of cam shaft portions 33, 33, a flange portion 34 and a connecting shaft portion 35 formed in this order from one end thereof towards the other end side. The engagement shaft portion 31, the journal portion 32, the flange portion 34 and the connecting shaft portion 35 are formed, with their axes aligned with an axis of the hinge pin 3. The cam shaft portions 33, 33 are arranged away from the axis of the hinge pin 3, parallel to each other and in point symmetry with respect to the axis of the hinge pin 3.

The engagement shaft portion 31 has a generally regular square configuration in section. It is protruded outside from the hinge main body 2. As shown in FIG. 9, the engagement shaft portion 31 is non-turnably engaged with a hole Ca formed on the rotation axis L of the cover member C of the cellular telephone A. By this, the hinge pin 3 is non-turnably connected to the cover member C. Accordingly, the hinge pin 3 and the cover member C are turned together.

The journal portion 32 and the connecting shaft portion 35 each have a circular configuration in section. The journal portion 32 is turnably connected to the open side end portion of the hinge main body 2. The connecting shaft portion 35 is turnably connected to the engagement hole 21a. By this, the hinge pin 3 is turnably connected to the main body 2 and hence, the cover member C is turnably connected to the main body B. The distal end portion of the connecting shaft 35 is penetrated through the engagement hole 21a and the engagement hole 41a of the reinforcement spring 4. An annular engagement portion 35a is formed on the distal end portion of the connecting shaft 35. By engagement of the engagement portion 35a with the basic board portion 41, the hinge pin 3 is prevented from escaping from the open portion side of the hinge main body 2.

A cam portion 5 is formed on an outer peripheral surface of each cam shaft portion 33. The cam portions 5, 5 have an identical configuration with each other. They are arranged in point symmetry with respect to the rotation axis L. Therefore, only one of the cam portions 5, 5 will be described. Most part of the cam portion 5 is formed on a portion of the outer peripheral surface of the cam shaft portion 33 which faces a reversed side of the rotation axis L so that the cam portion 5 is normally contacted with the pinchingly-holding portion 22a of the plate spring portion 22 even when the cover member C is in any position between a closed position I and an open position III. The cam portion 5 has first to fifth arcuate surfaces 51 to 55.

Figure 7:
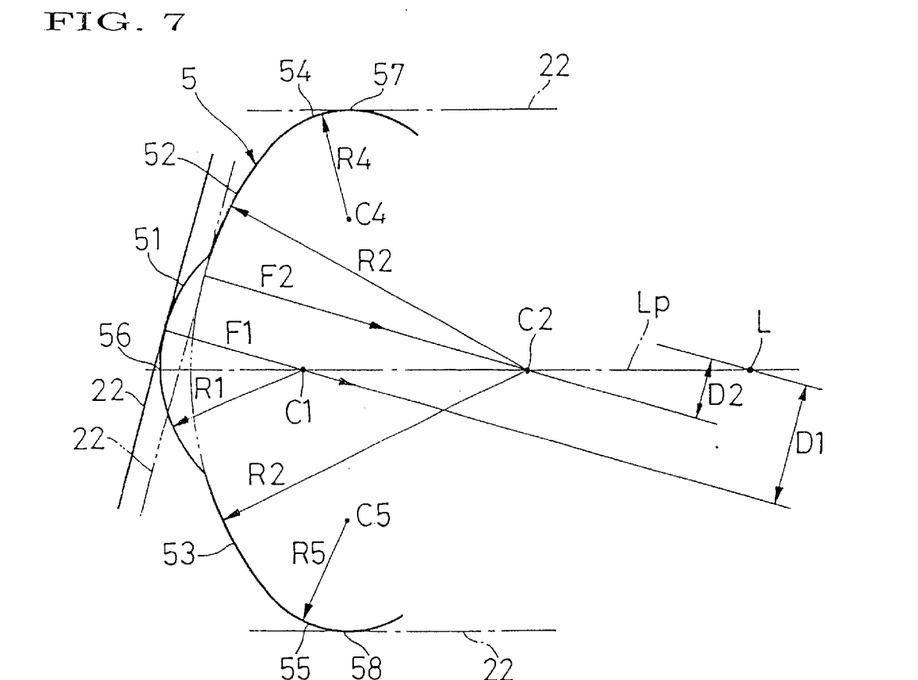
FIG. 7 is a view showing a relation between a cam portion and a plate spring portion, of the above first embodiment, when the cover member is slightly turned from a neutral position.

As shown in FIG. 7, the first arcuate surface 51 has a center of curvature C1 at a place away from the rotation axis L. and its radius of curvature is R1. The second and third arcuate surfaces 52, 53 has a same center of curvature C2 and a same radius of curvature R2 with each other. The center of curvature C2 is arranged at a place between the center of curvature C1 and the rotation axis L and on a line (hereinafter referred to as the "orthogonal line") Lp passing through the center of curvature C1 and orthogonal to the rotation axis L. In case a distance between the center of curvature C1 and the center of curvature C2 is Dc, this distance Dc is set to be slightly smaller than a difference (R2–R1) between the radius of curvature R2 and the radius of curvature R1. By this, one end portions of the second and third arcuate surfaces 52, 53 are crossed with opposite end portions of the first arcuate surfaces 51 in a circumferential direction of the cam shaft portion 33, respectively. The other end portions of the second and third arcuate surfaces 52, 53 are mutually reversedly extended a same length in a circumferential direction of the cam shaft portion 33 from the first arcuate portion 51.

The fourth and fifth arcuate surfaces 54, 55 have centers of curvature C4, C5 and radii of curvature R4, R5, respectively. The radii of curvature R4, R5 are set to be identical with each other. One end portions of the fourth and fifth arcuate surfaces 54, 55 are in contact with the other end portions of the second and third arcuate surfaces 52, 53, respectively. The other end portions of the fourth and fifth arcuate surfaces 54, 55 are crossed with a line passing through the center of curvature C4 (C5) and orthogonal to the orthogonal line Lp, and they are mutually extended a same length in the circumferential direction of the cam shaft portion 33 from crossing portions 57, 58.

As apparent from the above-mentioned construction of the first to fifth arcuate surfaces 51 to 55, the cam portion 5 is formed symmetrically with respect to the orthogonal line Lp.

Figure 1:
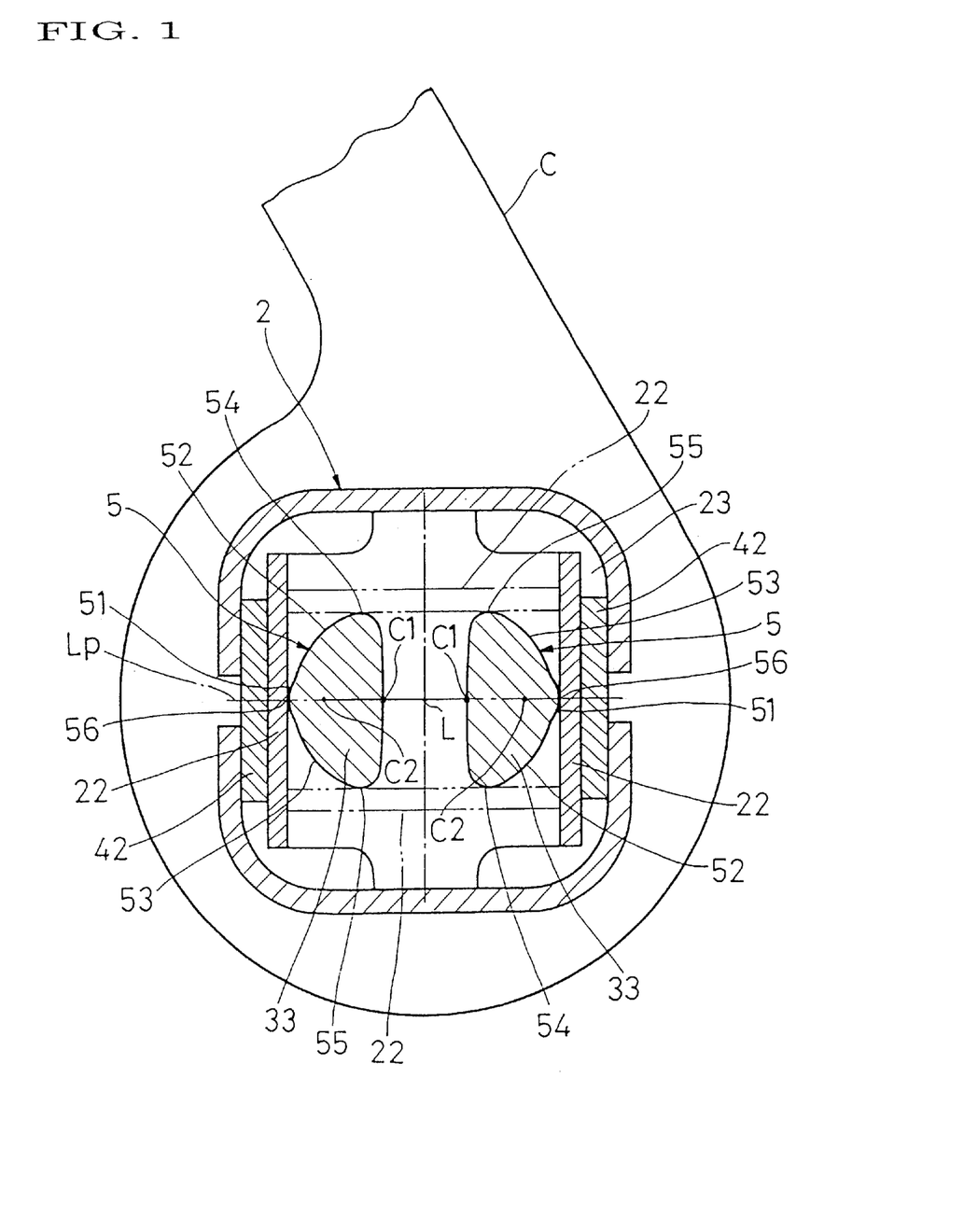
FIG. 1 is an enlarged sectional view taken on line X—X of FIG. 9 showing a first embodiment of the present invention, in which a cover member is turned to a neutral position.

As shown in FIG. 1, the first arcuate surface 51 is arranged such that when the cover member C is turned to the neutral position, the plate spring portion 22 contacts the crossing portion 56 between the first arcuate surface 51 and the orthogonal line Lp. In a state in which the plate spring portion 22 is in contact with the crossing portion 56, a biasing force of the plate spring portion 22 acts on the orthogonal line Lp. Accordingly, the biasing force of the plate spring portion 22 never acts a rotation torque for turning the hinge pin 3. As apparent from this, the crossing portion 56 becomes a neutral portion. Therefore, the crossing portion 56 is hereinafter referred to as the "neutral portion".

When the cover member C is turned normally and reversely from the neutral portion II, the plate spring portion 22 is brought away from the neutral portion 56. While the angle of rotation of the cover member C is small, the plate spring portion 22 is in contact with the first arcuate surface 51. When the angle of rotation of the cover member C is increased, the plate spring portion 22 is brought into contact with the second arcuate surface 52 or the third arcuate surface 53. When the plate spring portion 22 is in contact with the first arcuate surface 51, the biasing force of the plate spring portion 22 is directed to the center of curvature C1 from its point of contact. When the plate spring 22 is in contact with the second arcuate surface 52 or the third arcuate surface 53, the biasing force of the plate spring 22 is directed to the centers of curvature C2 of the second and third arcuate surfaces 52, 53 from its point of contact. Accordingly, an acting line of the biasing force of the plate spring portion 22 is offset from the rotation axis L and the biasing force of the plate spring portion 22 acts as a rotation torque for turning the hinge pin 3. When the plate spring portion 22 is in contact with the cam portion 5 on the side of the second arcuate surface 52 from the neutral portion 56, the rotation torque caused by the plate spring portion 22 acts such that the cover member C is turned towards the closed position side. When the plate spring portion 22 is in contact with the cam portion 5 on the side of the third arcuate surface 53 from the neutral portion 56, the rotation torque caused by the plate spring portion 22 acts such that the cover member C is turned towards the open position side.

As shown in FIG. 2, when the cover C is turned to the closed position I, the plate spring 22 contacts a contacting portion between the second arcuate surface 52 and the fourth arcuate surface 54 or its nearby portion. As a result, the biasing force of the plate spring 22 is directed from the contacting place towards the center of curvature C2 or C4. This causes the hinge pin 3 to be turned in a direction so that the cover member C is turned from the neutral position II side towards the closed position I side. Accordingly, the cover member C is maintained in a state in which the cover member C is in collision with the main body B. That is to say, the cover member C is maintained in the closed position.

As shown in FIG. 3, when the cover member C is turned to the open position III, the plate spring portion 22 simultaneously contacts the crossing portion 57 of one of the cam shaft portions 33, 33 and the crossing portion 58 of the other cam shaft portion 33. Accordingly, the plate spring portion 22 maintains the hinge pin 3 in a stop condition with a predetermined force. Hence, the cover member C is maintained in the open position III with moderation. As apparent from this, a turn restricting portion is composed of the crossing portions 57, 58.

Presume that, in a cellular telephone equipped with the hinge assembly 1 having the above-mentioned construction, the cover member C is, as shown in FIG. 7, slightly turned from the neutral position towards the closed position I or open position side (in FIG. 7, the cover member C is positionally fixed and the main body B is relatively turned.), and the plate spring portion 22 is in contact with a place slightly away from the neutral portion 56 of the first arcuate portion 51. In this state, the biasing force of the plate spring portion 22 acts such that it is directed towards the center of curvature C1 from the contacting place with the first arcuate portion 51. If a distance between the acting line of the biasing force F1 and the rotation axis L is represented by D1, a rotation torque of a magnitude of (F1×D1) acts on the hinge pin 3 by the biasing force of the plate spring portion 22.

On the other hand, presume that the first arcuate portion 51 is not formed and instead of it, the second and third arcuate portions 52, 53 is extended to the orthogonal line Lp. In that situation, the plate spring portion 22 contacts the second arcuate portion 52 or the third arcuate portion 54 (the plate spring portion 22 is in contact with the second arcuate portion 52 in FIG. 7). The biasing force of the plate spring 22 at that time acts towards the center of curvature C2 from the contacting place between the plate spring portion 22 and the second arcuate portion 52. If a distance between the acting line of the biasing force and the rotation axis L is represented by D2, a rotation torque of a magnitude of (F2×D2) is acted on the hinge pin 3 by the biasing force of the plate spring portion 22.

Here, the biasing forces F1, F2 are approximately equal in magnitude. However, the distance D1 is greatly longer than the distance D2. Therefore, in this hinge assembly in which the first arcuate surface 51 is formed, the rotation torque (=F1×D1) caused by the plate spring portion 22 when the cover member C is slightly turned from the neutral position II towards the closed position I or the open position III side can be made larger than the rotation torque (F2×D2) of a hinge assembly (conventional hinge assembly) in which the second and third arcuate portions 52, 53 are extended to the orthogonal line Lp instead of the first arcuate portion 51. Thus, when the cover member C is slightly turned from the neutral position II, the cover member C can be turned towards the closed position I or the open position III immediately.

As apparent from the above description, in this embodiment, the first cam surface is composed of one half portion from the neutral portion 56 of the first arcuate portion 51, the second arcuate portion 52 and the fourth arcuate portion 54 (excluding a portion after the crossing portion 57), while the second cam surface is composed of the other half portion of the first arcuate portion 51, the third arcuate portion 53 and the fifth arcuate portion 55 (excluding a portion after the crossing portion 58). The nearby portion of the neutral portion 56 of the first and second cam surfaces is composed of the first arcuate surface 51. The separated portion following the nearby portion of the first cam surface is composed of the second arcuate portion 52, while the separate portion following the nearby portion of the second cam surface is composed of the third arcuate portion 53.

Figure 8:
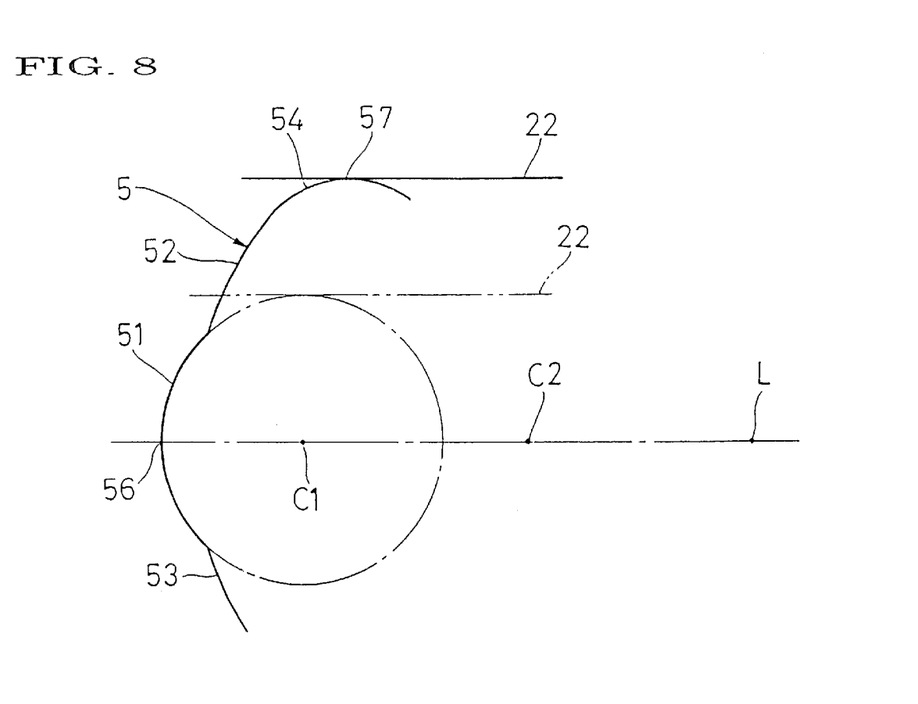
FIG. 8 is a view showing a relation between a cam portion and a plate spring portion, of the above first embodiment, when the cover member is turned to an open position.

When the cover member C is turned to the open position III, the plate spring portion 22 is resiliently displaced towards the rotation axis L as indicated by a solid line of FIG. 8 and contacts the fourth arcuate portion 54. On the other hand, in the case where the second arcuate portion 52 and the fourth arcuate portion 54 are not formed and instead of them, the first arcuate portion 51 is formed in such a manner as to be extended, because the radius of curvature R1 of the first arcuate portion 51 is smaller than the radius of curvature R2 of the second arcuate portion 52, the plate spring portion 22 is more approached to the rotation axis L as indicated by an imaginary line of FIG. 8 than in the case where it contacts the fourth arcuate portion 54 and is greatly resiliently displaced while the cover member C is turned from the neutral position II to the open position III. For this reason, a displacement amount of the plate spring portion 22 is increased and liable to be broken by fatigue soon. In other words, because the radius of curvature R2 of the second arcuate portion 52 is larger than the radius of curvature R1 of the first arcuate portion 51, the resilient displacement amount of the plate spring portion 22 can be reduced. This can prevent the plate spring portion 22 from being broken by fatigue soon.

Other embodiments of the present invention will be described next. In the embodiments to be described hereinafter, only those constructions which are different from the construction of the above embodiment are described, and like component parts are denoted by like reference numerals and description thereof is omitted.

Figure 12:
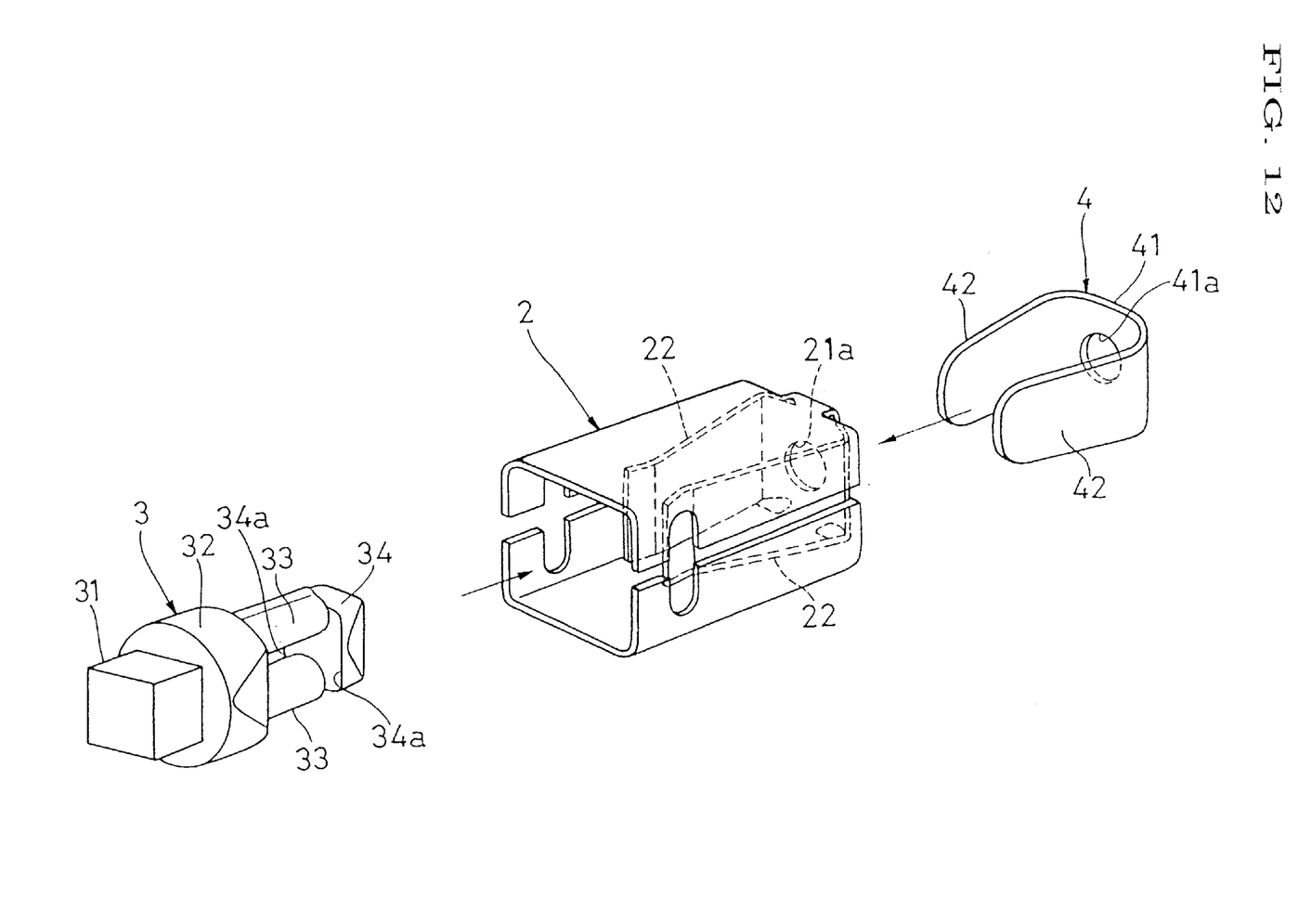
FIG. 12 is an exploded perspective view showing a second embodiment of the present invention.
Figure 13:
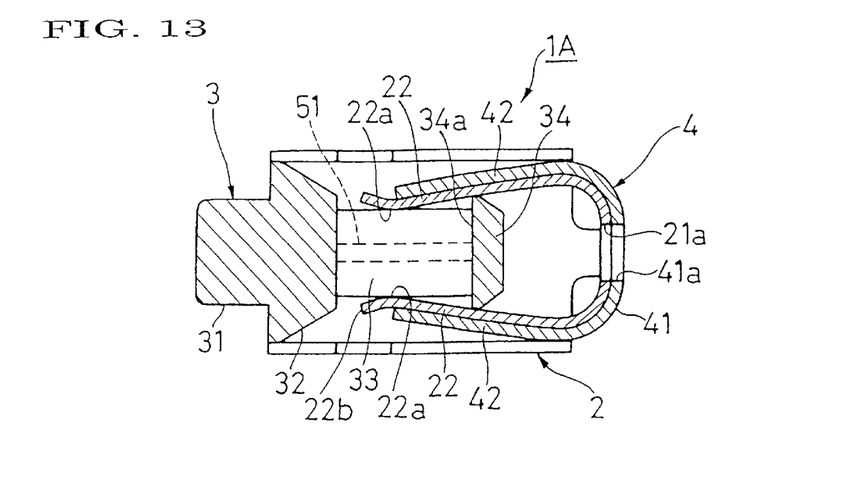
FIG. 13 is a sectional view of the above second embodiment.

FIGS. 12 and 13 show a second embodiment of the present invention. In a hinge assembly 1A of this embodiment, the connecting shaft portion 35 is not formed on the hinge pin 3. For this reason, the reinforcement spring 4 is not connected to the bottom portion 21 of the hinge main body 2 by the connecting shaft portion 35. Instead, the reinforcement spring 4 is connected to the plate spring portions 22, 22 by press contact of the opposite end portions of the reinforcement spring 4 with the distal end portions of the plate spring portions 22, 22. Accordingly, there is no need of a provision of the engagement holes 21a, 41a in this embodiment. Also, by contact of the plate spring portions 22, 22 with end edge portions 34a, 34a on the open portion side of the opposite side portions of the flange portion 34, the hinge pin 3 can be prevented from escaping towards the open portion side of the hinge main body 2 from the bottom portion 21 side. Moreover, in order to more surely prevent the hinge pin 3 from escaping, the end edge portions 34a, 34a of the flange portion 34 are each formed in a linear configuration and they are line contacted with the plate spring portions 22, 22.

Figure 14:
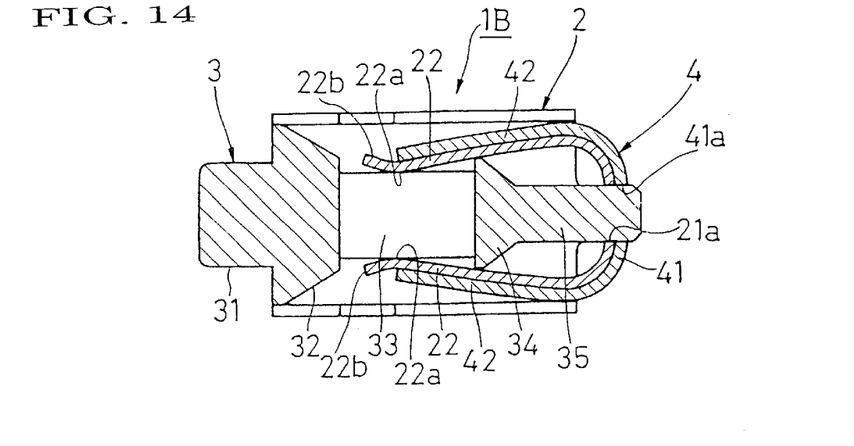
FIG. 14 is a sectional view showing a third embodiment of the present invention.

FIG. 14 shows a third embodiment of the present invention. In a hinge assembly 1B of this embodiment, there is a provision of the connecting shaft portion 35 but the engagement portion 35a is not formed on the connecting portion 35. For this reason, as in the embodiments of FIGS. 12 and 13, the reinforcement spring 4 is connected to the plate spring portions 22, 22, and the hinge pin 3 is prevented from escaping by the plate spring portions 22, 22.

Figure 15:
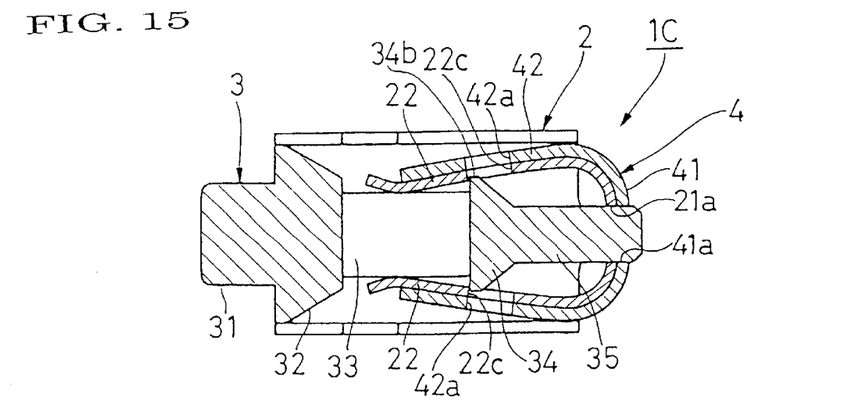
FIG. 15 is a sectional view showing a fourth embodiment of the present invention.
Figure 16:
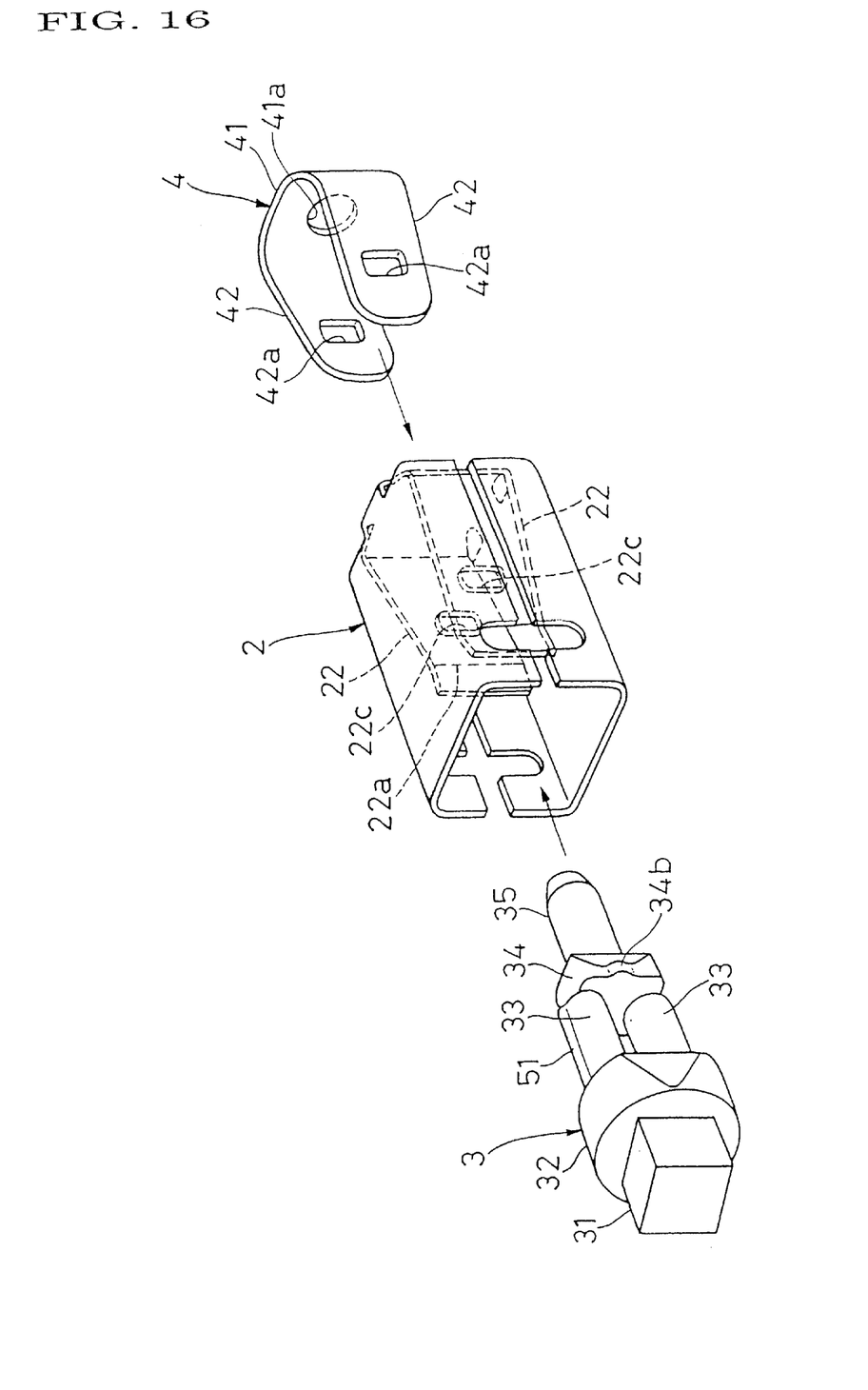
FIG. 16 is an exploded perspective view showing a fourth embodiment of the present invention.

FIGS. 15 and 16 show a fourth embodiment of the present invention. In a hinge assembly 1C of this embodiment, an engagement hole 22c is formed in an intermediate portion of the plate spring portion 22. By engagement of a protrusion 34b formed on a side portion of the flange portion 34 with the engagement hole 22c, the hinge pin 3 is prevented from escaping. In this embodiment, although an engagement hole 42a is formed in the reinforcement plate portion 42 of the reinforcement spring 4, too, this hole 42a is not absolutely necessary because the protrusion 34b is not engaged with the engagement hole 42a. Of course, it may be designed such that the protrusion 34b is also engaged with the engagement hole 42a in order to prevent the hinge pin 3 and the reinforcement spring 4 from escaping.

The present invention should not be limited to the above embodiments. Many changes and modifications can be made in accordance with necessity.

For example, in the above embodiments, the hinge main body 2 is non-turnably connected to the main body B of the cellular telephone A and the hinge pin 3 is non-turnably connected to the cover member C. In the alternative, it is also accepted that the hinge main body 2 is non-turnably connected to the cover member C and the hinge pin 3 is non-turnably connected to the main body B.

Moreover, in the above embodiments, two cam shaft portions 33, 33 located away from the rotation axis L are formed and a space is formed between the two cam shaft portions 33, 33. However, the two cam shaft portions 33, 33 may be formed integrally so that no space is formed between therebetween. In that case, a portion between the fourth and fifth arcuate portions 54, 55 which contacts the plate spring portion 22 may be formed in a planar surface (turn restricting portion) which is surface contacted with the plate spring portion 22, or that portion may be recessed so as not to contact with the plate spring portion 22.

Although the plate spring portion 22 as a resilient member is integrally formed with the hinge main body 2, the portion 22 may be formed as a separate unit and fixed to the hinge main body.

Although the neutral portion 56 is formed as one point in the circumferential direction of the cam shaft portion 33, it is also accepted that the neutral portion 56 is composed of an arcuate surface about the rotation axis L of the hinge pin 3 so that the neutral portion 56 has a predetermined width in the circumferential direction.

Although two each of the cam portions 5 and the plate spring portions 22 are formed, one each of them may be formed.

INDUSTRIAL APPLICABILITY

A hinge assembly according to the present invention can be used as a hinge assembly for turnably connected two articles such as a main body and a cover member of a cellular telephone.

What is claimed is:

1. A hinge assembly comprising:
   a hinge main body and a hinge pin turnably supported by said hinge main body;
   said hinge main body being provided with a resilient member;
   said hinge pin having a rotational axis and a circumference extending around the rotational axis;
   said hinge pin having an outer periphery;
   a cam portion formed in the outer periphery of the hinge pin being arranged to be press contacted by said resilient member with a pressing force;
   said cam portion including:
      a neutral portion for directing the pressing force of said resilient member toward the rotational axis of said hinge pin, and
      first and second cam surfaces extending in opposite circumferential directions around said hinge pin from said neutral portion and providing for converting the pressing force of said resilient member into a rotational torque for turning said hinge pin in opposite directions around the rotational axis,
   wherein said first and second cam surfaces include:
      nearby portions that are adjacent to said neutral portion and
      separated portions that follow said nearby portions remote from paid neutral portion;
   said separated portions of said first and second cam surfaces being formed by arcuate surfaces having a same radius of curvature;
   said neutral portion and said nearby portions being formed by an arcuate surface having a smaller radius of curvature than the radius of curvature of the arcuate surfaces forming said separated portions;
   a center of curvature of the arcuate surface forming said nearby portions and a center of curvature of the arcuate surfaces forming said separated portions being both located between the rotational axis of said hinge pin and said neutral portion on a line that passes through said neutral portion and that extends orthogonal to the rotational axis of said hinge pin,
   the center of curvature of the arcuate surfaces forming said separated portions being located apart from the rotational axis of said hinge pin, and
   the center of curvature of the arcuate surface forming said neutral portion and said nearby portions being located between the center of curvature of the arcuate surfaces forming said separated portions and said neutral portion.

2. A hinge assembly according to claim 1, wherein said cam portion further includes a turn restricting portion that is formed on an outer peripheral surface of said hinge pin following at least one of said first and second cam surfaces of said hinge pin and that is capable of contacting said resilient member in at least two points separated in a circumferential direction of said hinge pin, thereby maintaining said hinge pin in a predetermined rotational position.

3. A hinge assembly according to claim 2, wherein:
   said cam portion is one of two cam portions that are mirror symmetrical with respect to a plane that includes the rotational axis of said hinge pin, and
   said resilient member is one of two resilient members that are arranged in contact with cam surfaces of said cam portions in such a manner as to correspond to each other.

4. A hinge assembly according to claim 1, wherein:
   said cam portion is one of two cam portions that are mirror symmetrical with respect to a plane that includes the rotational axis of said hinge pin, and
   said resilient member is one of two resilient members that are arranged in contact with cam surfaces of said cam portions in such a manner as to correspond to each other.

5. A hinge assembly according to claim 4, wherein each of said am portions further includes a turn restricting portion that is formed on an outer peripheral surface of said hinge pin following at least one of said first and second cam surfaces of said hinge pin and that is capable of contacting said resilient member in at least two points separated in a circumferential direction of said hinge pin, thereby maintaining said hinge pin in a predetermined rotational position.

* * * * *

UNITED STATES PATENT AND TRADEMARK OFFICE
CERTIFICATE OF CORRECTION

PATENT NO.    : 6,588,063 B2
DATED         : July 8, 2003
INVENTOR(S)   : Kazuyoshi Oshima and Katsuya Imai It is certified that error appears in the above-identified patent and that said Letters Patent is hereby corrected as shown below:

<u>Title page,</u>
Item [22], replace "May" with -- March --

<u>Column 9,</u>
Line 57, replace "paid" with -- said --

<u>Column 10,</u>
Line 49, replace "am" with -- cam --

Signed and Sealed this

Twenty-fifth Day of November, 2003

JAMES E. ROGAN
*Director of the United States Patent and Trademark Office*